US012789293B1

(12) United States Patent
Wells Torres et al.

(10) Patent No.: US 12,789,293 B1
(45) Date of Patent: Nov. 10, 2026

(54) CUSTOM MICROSTRUCTURES USING FEMTOSECOND LASER PROCESSING AND CATALYSIS APPLICATION

(71) Applicant: Honeywell Federal Manufacturing & Technologies, LLC, Kansas City, MO (US)

(72) Inventors: Sabrina Marie Wells Torres, Lee's Summit, MO (US); Connor Daniel Pearson, Overland Park, KS (US); Andrea Hicks Cummings, Lee's Summit, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 19/372,906

(22) Filed: Oct. 29, 2025

Related U.S. Application Data

(60) Provisional application No. 63/713,285, filed on Oct. 29, 2024.

(51) Int. Cl.

| | |
|---|---|
| ***B23K 26/364*** | (2014.01) |
| ***B01J 35/50*** | (2024.01) |
| ***B23K 26/0622*** | (2014.01) |
| ***B23K 103/00*** | (2006.01) |

(52) U.S. Cl.
CPC ............. *B23K 26/364* (2015.10); *B01J 35/50* (2024.01); *B23K 26/0624* (2015.10); *B23K 2103/56* (2018.08)

(58) Field of Classification Search
CPC .............. B23K 26/364; B23K 26/0624; B23K 2103/56; B01J 35/50
See application file for complete search history.

(56) References Cited

U.S. PATENT DOCUMENTS

| | | | | |
|---|---|---|---|---|
| 2008/0299408 | A1* | 12/2008 | Guo | B23K 26/0006 219/121.72 |
| 2012/0328905 | A1* | 12/2012 | Guo | B23K 26/0006 428/141 |
| 2018/0106954 | A1* | 4/2018 | Ayi-Yovo | B23K 26/00 |
| 2019/0314934 | A1* | 10/2019 | Sercel | B23K 26/354 |
| 2021/0237203 | A1* | 8/2021 | Zhong | B05D 5/08 |
| 2021/0268606 | A1* | 9/2021 | Kim | B23K 26/0093 |
| 2021/0299782 | A1* | 9/2021 | Desjardins | B23K 26/0006 |
| 2022/0009124 | A1* | 1/2022 | Xiao | B23K 26/34 |
| 2022/0055326 | A1* | 2/2022 | Maurice | G02C 7/022 |

(Continued)

*Primary Examiner* — Travis M Figg
(74) *Attorney, Agent, or Firm* — Erise IP, P.A.

(57) ABSTRACT

Systems relating to fabricating tailored channels and microstructures using femtosecond laser processing. The system may include a substrate configured to be engraved by the femtosecond laser device, a channel engraved into the substrate by the femtosecond laser device; and a plurality of microstructures disposed with the channel, wherein the plurality of microstructures are configured to receive a catalyst. The system may include a catalyst, wherein the catalyst is configured to attach to the plurality of microstructures in the channel. The system may include one or more pits, wherein the one or more pits are configured to receive the catalyst and the catalyst is configured to attach to the one or more pits. The plurality of microstructures may be dispersed evenly throughout the channel such that the catalyst is dispersed evenly throughout the channel.

14 Claims, 8 Drawing Sheets

(56) References Cited

U.S. PATENT DOCUMENTS

| | | | | |
|---|---|---|---|---|
| 2022/0072663 | A1* | 3/2022 | Audouard | B23K 26/0006 |
| 2022/0111469 | A1* | 4/2022 | Myles | B23K 26/53 |
| 2023/0079919 | A1* | 3/2023 | Claussen | B01L 3/502707 29/25.03 |
| 2023/0166253 | A1* | 6/2023 | Torres | B01L 3/502707 |

* cited by examiner

CUSTOM MICROSTRUCTURES USING FEMTOSECOND LASER PROCESSING AND CATALYSIS APPLICATION

CROSS-REFERENCE TO RELATED APPLICATIONS

This patent application claims priority benefit, with regard to all common subject matter, of U.S. Provisional Patent Application No. 63/713,285, filed Oct. 29, 2024, and entitled "CUSTOM MICROSTRUCTURES USING FEMTOSECOND LASER PROCESSING AND CATALYSIS APPLICATION." The above-referenced application is hereby incorporated in its entirety into the present application.

STATEMENT OF GOVERNMENT SUPPORT

This invention was made with government support under contract number DE-NA-0002839 awarded by the United States Department of Energy/National Nuclear Security Administration. The government has certain rights in the invention.

BACKGROUND

1. Field

Embodiments of the present disclosure relate to laser processing. More specifically, embodiments of the present disclosure relate to manufacturing custom microstructures using femtosecond laser processing.

2. Related Art

A well-known system for chemical processing is a packed-bed system, such as a packed-bed reactor. In a packed-bed system, the reactor may include a packed bed filled with a catalytic material, which increases the rate of a chemical reaction without being consumed by the reaction. In packed-bed systems, catalytic materials are often attached to catalyst supports, which are typically solid materials with high surface areas. The catalytic materials attached to the catalyst supports may then be packed into the bed of the system in either a structured configuration or a random configuration.

A well-known problem with catalysis—the process of increasing the rate of a chemical reaction using the catalytic material—in packed-bed reactor systems is channeling. Channeling may occur when inhomogeneous packing of the bed results in an uneven flow throughout the system. An uneven flow may result in inefficiency, inconsistency, and waste due to particular regions of catalytic material in a bed being more exposed to the reactant than others. As such, systems and methods of prevent channeling and other problems with packed-bed columns are desired.

SUMMARY

In some aspects, the techniques described herein relate to a channel system fabricated by a femtosecond laser device, the channel system including: a substrate configured to be engraved by the femtosecond laser device; a channel engraved into the substrate by the femtosecond laser device; and a plurality of microstructures disposed with the channel, wherein the plurality of microstructures are configured to receive a catalyst.

In some aspects, the techniques described herein relate to a channel system, further including: one or more channel branches attached to a first end of the channel, wherein the one or more channel branches are configured to be an outlet of the channel, wherein the outlet is configured to expel one or more substances out of the channel.

In some aspects, the techniques described herein relate to a channel system, further including: an inlet configured to receive the one or more substances into the channel, the inlet located at a second end of the channel.

In some aspects, the techniques described herein relate to a channel system, further including: the catalyst, wherein the catalyst is configured to attach to a surface of the plurality of microstructures.

In some aspects, the techniques described herein relate to a channel system, wherein the plurality of microstructures are dispersed evenly throughout the channel such that the catalyst is dispersed evenly throughout the channel.

In some aspects, the techniques described herein relate to a channel system, further including: one or more pits disposed between adjacent microstructures from the plurality of microstructures, wherein the one or more pits are configured to receive the catalyst.

In some aspects, the techniques described herein relate to a channel system, further including: the catalyst, wherein the catalyst is configured to attach to a surface of the one or more pits.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
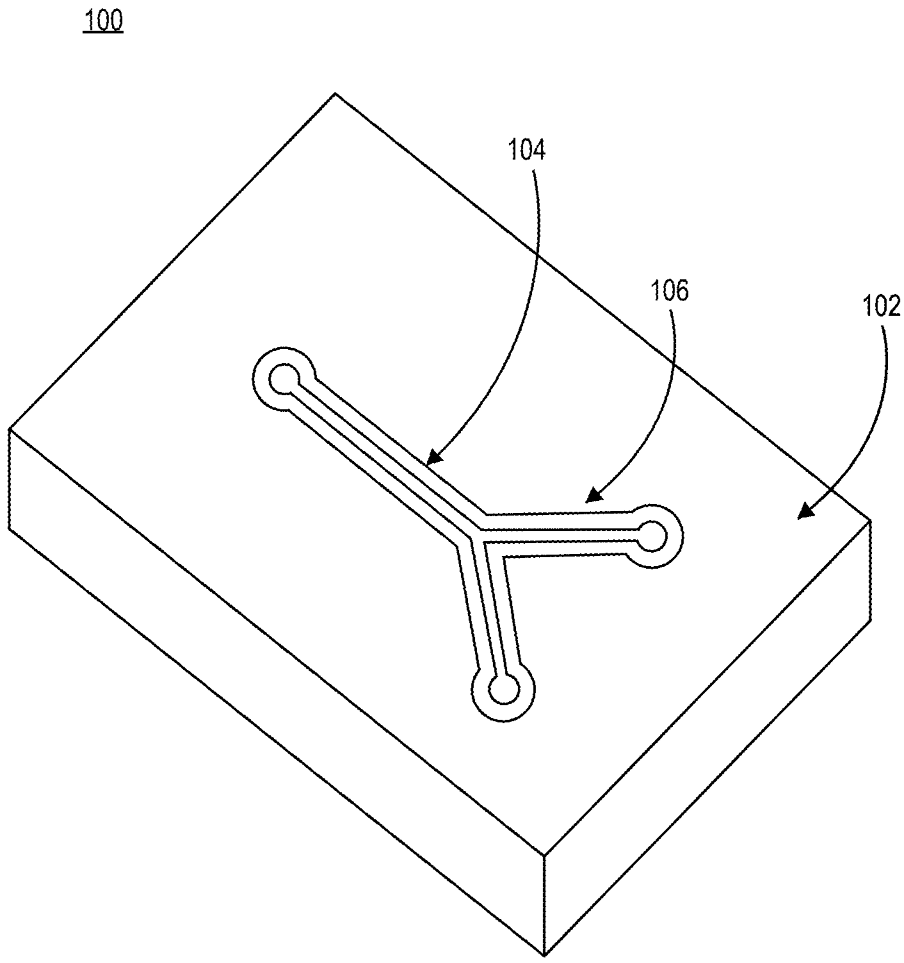
FIG. 1 depicts an exemplary channel system in accordance with embodiments of the invention.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the technology can include a variety of combinations and/or integrations of the embodiments described herein.

At a high level, embodiments of the invention relate to channel systems that are customizable using femtosecond laser processing and a catalysis application thereof. The channel systems may include a substrate (e.g., a surface) with at least one channel engraved on the surface. The channel may be attached to one or more channel branches. The characteristics of the channel and the one or more channel branches (such as the width, height, length, density, etc.) may be tailored for a specific purpose, such as catalysis. The channel and the one or more channel branches may include a plurality of microstructures attached to the channel and the one or more channel branches. The plurality of microstructures may be dispersed evenly, unevenly, or randomly throughout the channel and the channel branches. Similarly to the channel and the channel branches, the characteristics of the plurality of microstructures may be tailored for a specific purpose. For example, the plurality of microstructures may be tailored such that the surface area of the plurality of microstructures is optimized. Accordingly, a catalyst may be more likely to attach to the surface of the plurality of microstructures for a catalysis application.

FIG. 1 depicts an exemplary channel system in accordance with embodiments of the invention and is generally referred to by reference numeral 100. At a high level, channel system 100 may be a substrate/surface with one or more structures engraved into the substrate/surface. Channel system 100 may have any number of applications, including, but not limited to, electronics, chemistry, flow chemistry, microfluidics, and the like. Channel system 100 may include substrate 102 and channel 104. It is noted herein that Channel system 100 may include any number of channels and or structures, including channel 104.

In some embodiments, channel system 100 may include substrate 102 as a base for fabrication. Substrate 102 may be a material suitable for fabrication, surface modification, structure patterning, or any other process. For example, substrate 102 may be a suitable material for processing via a laser system, such as with channel fabrication system 600 depicted in FIG. 6. Substrate 102 may be any material now known or later developed, including, but not limited to, titanium, silver, stainless steel, aluminum, copper, platinum, silicon, other metals, and similar materials. In some embodiments, substrate 102 may be formed from a plurality of layers, wherein the materials forming the layers may differ from one another.

Substrate 102 may be any shape, length, width, and thickness suitable for its particular application. For example, substrate 102 may be a 2-inch-long silicon wafer with a thickness greater than or equal to 500. For another example, substrate 102 may be a support structure with a shape, size, and thickness suitable for supporting catalytic material, such as a sphere, cube, hollow cube, solid cylinder, hollow cylinder, four-hole cylinder, single ring, cross web, grooved cylinder, pall ring, saddle, and other shapes.

In some embodiments, channel system 100 may include channel 104. Broadly, channel 104 may be engraved/fabricated into substrate 102. For example, channel 104 may be engraved into substrate 102 using a laser processing system, such as a femtosecond laser processing system. The size of channel 104 may be tunable such that it may be engraved into substrate 102 to meet a particular length, width, and depth. In some embodiments, channel 104 may be made up of connected channels. For example, as depicted in FIG. 1, channel 104 may be Y-shaped. In such embodiments, channel 104 may include one or more channel branches 106.

In some embodiments, channel 104 and one or more channel branches 106 may make up a flow chemistry system. In such embodiments, one or more channel branches 106 may behave as the outlets to expel reaction products from channel 104, with inlets for channel 104 being located in channel 104. In some embodiments, one or more channel branches 106 may be located at any point in channel 104, such as in the middle or at the other end channel 104. It is noted herein that channel system 100 need not contain one or more channel branches 106. In a similar fashion to channel 104, one or more channel branches 106 may be tunable to meet a particular length, width, or depth for a given application.

In some embodiments, one or more channel branches 106 may lead to additional systems and/or components of channel system 100. For example, channel system 100 may be configured to separate one or more substances flowing through channel 104. As such, one or more channel branches 106 may receive different substances or combinations of substances, where the substances exit channel 104 through one or more channel branches 106.

In some embodiments, channel 104 may include any number of microstructures. Generally, the microstructures may be structures on the surface of or within channel 104. The microstructures of channel 104 may be formed during the processing and manufacturing of channel 104. For example, the microstructures may be formed by a femtosecond laser processing system. In some embodiments, one or more channel branches 106 may also include any number of microstructures. For example, both channel 104 and one or more channel branches 106 may contain microstructures. For another example, either channel 104 of one or more channel branches 106 may contain microstructures. The microstructures of channel 104 and/or one or more channel branches 106 are described further below in FIG. 2. In embodiments where both channel 104 and one or more channel branches 106 include microstructures, the micro structures may be different or the same between channel 104 and each of the one or more channel branches 106.

Figure 2:
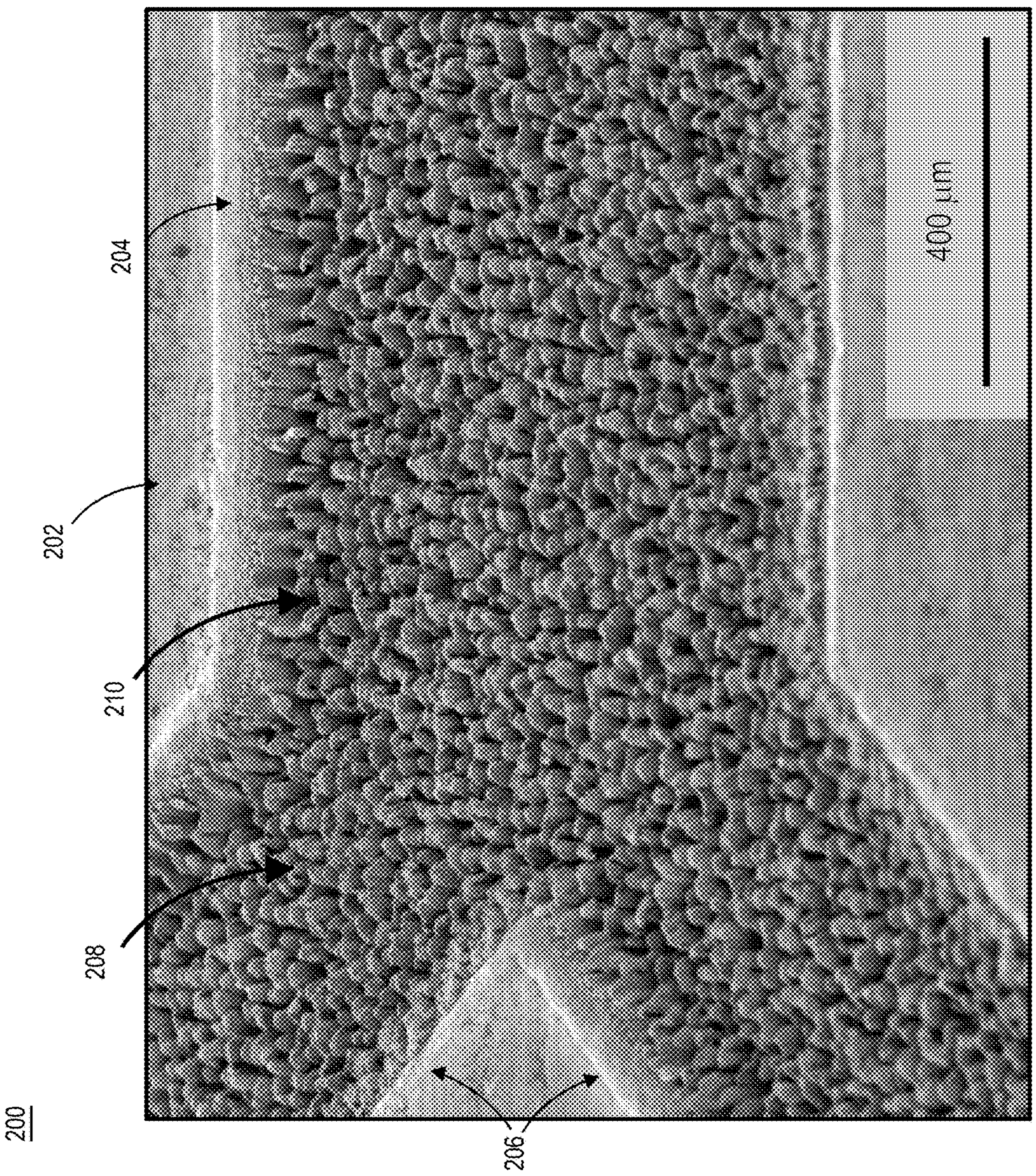
FIG. 2 depicts an exemplary channel system with microstructures in accordance with embodiments of the invention.

FIG. 2 depicts an exemplary channel system with microstructures disposed within it, in accordance with embodiments of the invention, and is generally referred to by reference numeral 200. Generally, channel system 200 may be a close-up image of channel system 100 depicted in FIG.

1. In some embodiments, in a substantially similar manner to channel system 100, channel system 200 may include substrate 202, channel 204, one or more channel branches 206, and a plurality of microstructures 208.

In some embodiments, channel system 200 may include substrate 202, generally related to substrate 102 depicted in FIG. 1. Substrate 202 may be any suitable material now known or later developed for fabrication, such as a material suitable for femtosecond laser processing. In some embodiments, channel system 200 may include channel 204, which is generally related to channel 204 depicted in FIG. 1. As mentioned above, channel 204 may be tunable in regards to length, width, depth, and similar characteristics of channel 204. For example, the size of channel 204 may be tuned to accommodate a particular volume of liquid.

In some embodiments, channel system 200 may include one or more channel branches 206, generally relating to one or more channel branches 106 described above with regard to FIG. 1. One or more channel branches 206 may be outlets for channel system 200, such as with a flow chemistry application. In some embodiments, one or more channel branches 206 may be configured to receive separated substances, where one channel branch receives a first substance, and a second channel branch receives a second substance. It is noted herein that channel system 200 may contain no channel branches without departing from the scope of the invention herein.

As mentioned above with respect to FIG. 1, channel 204 may include a plurality of microstructures 208. A plurality of microstructures 208 may be structures formed into channel 204 during processing. For example, plurality of microstructures 208 may be engraved into channel 204 during the time in which channel 204 is engraved. As such, plurality of microstructures 208 may be engraved using any suitable fabrication technique now known or later developed, including, but not limited to, femtosecond laser processing.

In some embodiments, the various characteristics of plurality of microstructures 208 may be tunable, such as the thickness, height, width, density, and size. For example, the depth of the surface roughness as it relates to channel 204 and plurality of microstructures 208 may be approximately 50 μm. For another example, the depth of the surface roughness as it relates to channel 204 and plurality of microstructures 208 may be greater than or less than 50 μm. The ability to tune the characteristics of plurality of microstructures 208 may allow for channel 204 and areas within channel 204 to be tuned to generate desired functionalities. For example, the thickness of plurality of microstructures 208 may be increased in one area of channel 204 relative to the rest of channel 204 in order to create a region that promotes greater levels of mixing.

Generally, plurality of microstructures 208 may be of any geometry and/or shape now known or later developed. In some embodiments, a plurality of microstructures 208 may be mound-shaped, as depicted in FIG. 2. In some embodiments, a plurality of microstructures 208 may be pyramid-shaped or column-shaped. In some embodiments, channel 204 may contain a variety of shapes for a plurality of microstructures 208. This concept is described further below as it relates to FIG. 4.

As discussed further below with respect to FIG. 5A-5B, plurality of microstructures 208 may be configured to be support structures for catalytic material. In some embodiments, a plurality of microstructures 208 may be manufactured to be a shape suitable for attaching a catalyst. For example, a plurality of microstructures 208 may be manufactured to optimize available surface area, which may provide an optimized amount of surface area for a catalyst to attach (or, if the microstructures are themselves made out of a catalytic material, to optimize catalytic surface area directly). In some embodiments, a plurality of microstructures 208 may be manufactured to have divots and/or cracks. In such embodiments, a catalyst may attach to plurality of microstructures 208 via the divots and/or cracks.

In some embodiments, channel system 200 may include one or more pits 210. One or more pits 210 may be formed from the space between adjacent microstructures in the plurality of microstructures 208. Similarly to the plurality of microstructures, 208, one or more pits 210 may be tunable for a particular application. For example, one or more pits 210 may be tuned to have a specific height, width, and/or depth. As such, one or more pits 210 may be tuned to perform a certain function, such as to allow a catalyst enough surface area to properly attach.

Figure 3:
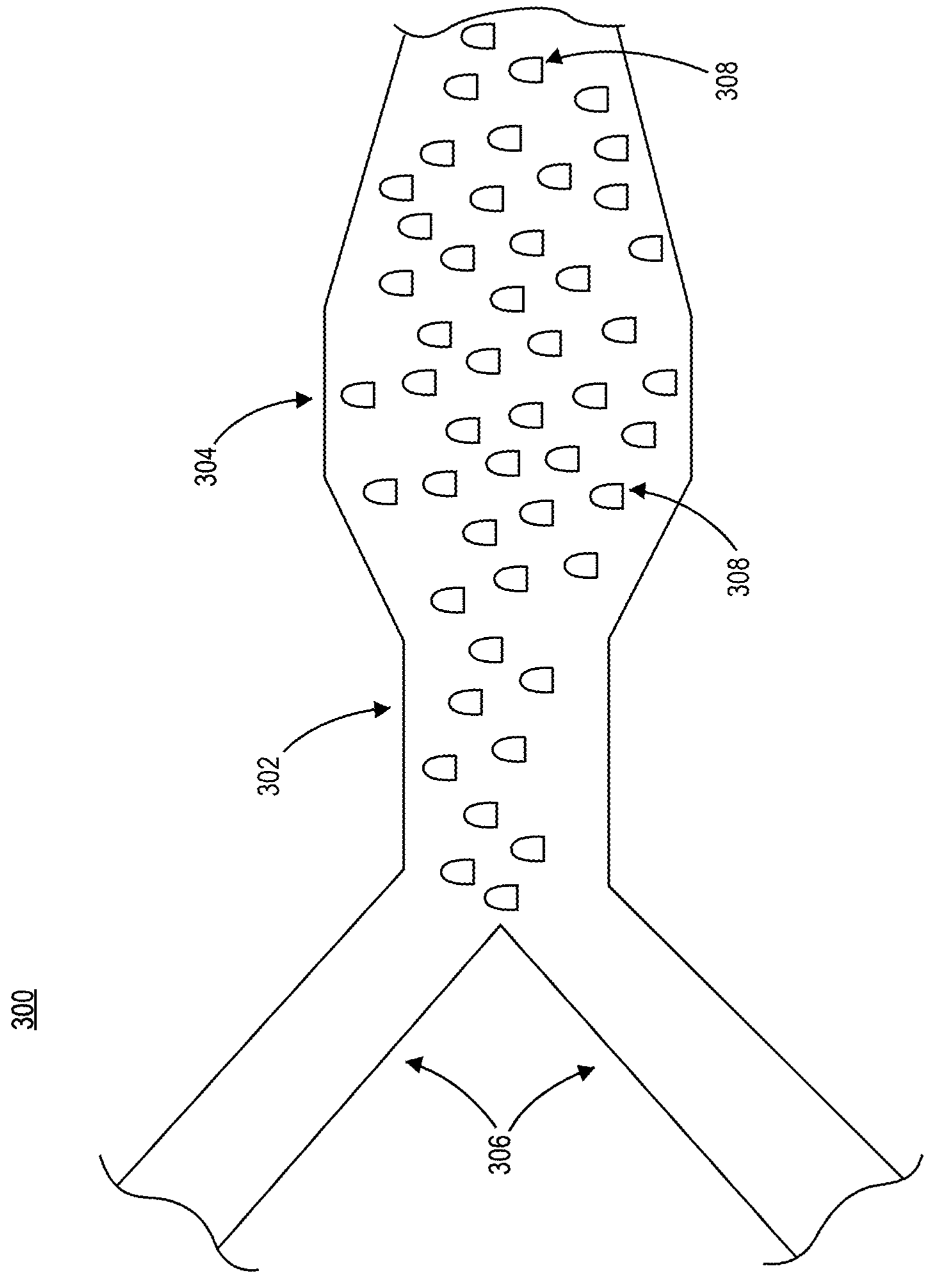
FIG. 3 depicts an exemplary channel system with microstructures in accordance with embodiments of the invention.

Continuing on, FIG. 3 depicts an exemplary channel system with microstructures in accordance with embodiments of the invention and generally referred to by reference numeral 300. Similarly to the channel systems described above, channel system 300 may include a channel, one or more channel branches 306, and a plurality of microstructures 308. As described above, channel system 300 may be customized (e.g., tuned) in a number of ways. For example, channel system 300 may be designed and fabricated to have a particular length, width, depth, microstructure count, and the like.

In some embodiments, channel system 300 may be tuned to have varying widths throughout the channel. For example, channel location 302 may be narrower in width relative to the width of channel location 304. Providing various widths within channel system 300 may allow for different processes and goals to be accomplished by different locations in a flow chemistry state. For example, channel system 300 may include varying widths throughout the channel and one or more channel branches 306 in order to vary the flow rates and/or pressure placed on substances flowing through the channel.

While a channel with varying widths throughout the channel is depicted in FIG. 3, other properties and dimensions of channel system 300 may be modified, including depth, thickness, density, microstructure density, and length. For example, channel system 300 may be modified such that the channel is deeper, which may allow for a higher volume of substances to flow through the channel during a flow chemistry process. For another example, channel system 300 may be modified to have regions of varying densities of the plurality of microstructures 208, such that certain areas of the channel may provide more mixing than other areas of the channel.

Figure 4:
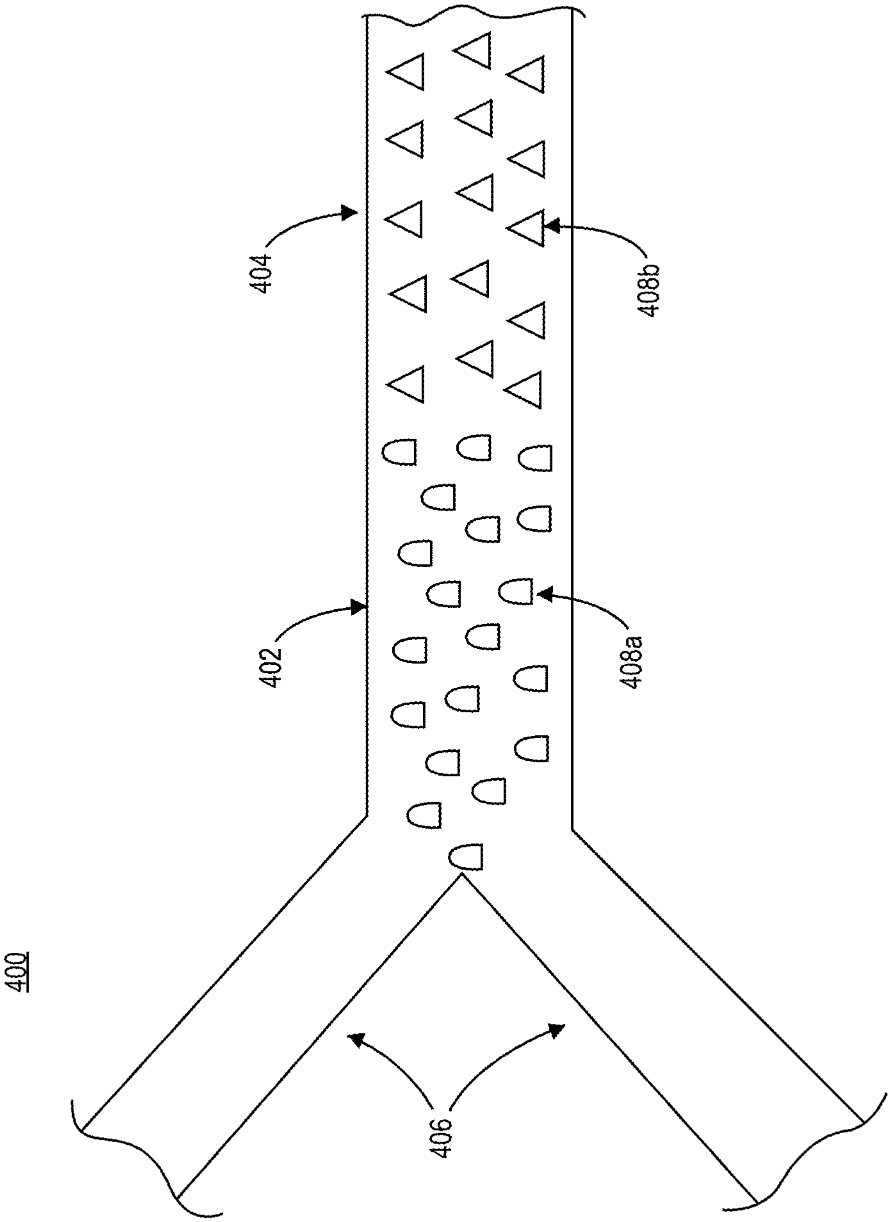
FIG. 4 depicts an exemplary channel system with microstructures in accordance with embodiments of the invention.

Continuing on, FIG. 4 depicts an exemplary channel system with microstructures in accordance with embodiments of the invention and generally referred to by reference numeral 400. In a substantially similar manner to channel system 200 depicted above in FIGS. 2 and 3, channel system 400 may include a channel, one or more channel branches 406, generally related to one or more channel branches 206, and a plurality of microstructures 408, generally related to a plurality of microstructures 208.

At a high level, channel system 400 may contain a plurality of microstructures with varying characteristics throughout the channel. For example, channel system 400 may contain microstructures with varying sizes, shapes, thicknesses, densities, and the like. This may prove advantageous because different microstructures may have differing effects for a given application. For example, different microstructure shapes may cause different levels of mixing in a flow chemistry system. For another example, different microstructure shapes may change the way in which a catalyst attaches to the channel, resulting in more catalytic materials being deposited in certain regions of the channel rather than in other regions. This may have significant effects on substances flowing in channel system 400 and the reactions occurring between the substances.

In some embodiments, channel system 400 may have intermixed microstructures with varying characteristics throughout the channel and one or more channel branches 406. In other embodiments, channel system 400 may have regions of a particular type of microstructure and regions of a differing type of microstructure. As can be appreciated, channel system 400 may be tuned to have microstructures of varying characteristics in a predetermined configuration to accomplish a particular purpose.

In some embodiments, channel system 400 may include channel location 402 with a plurality of microstructures 408*a* and channel location 404 with a plurality of microstructures 408*b*. In some embodiments, plurality of microstructures 408*a* may have a first shape, while plurality of microstructures 408*b* may have a second shape that differs from the first shape. For example, as depicted in FIG. 4, plurality of microstructures 408*a* may be a rounded, mound-type structure, while plurality of microstructures 408*b* may be a pointed, pyramid structure.

By creating separate regions of plurality of microstructures 408*a* and plurality of microstructures 408*b*, channel location 402 and channel location 404 may serve different purposes within channel system 400. For instance, if catalytic materials attach to plurality of microstructures 408*a* rather than plurality of microstructures 408*b* due to the shape of plurality of microstructures 408*a*, then channel location 402 may contain a higher density of catalytic materials than channel location 404. As such, if channel system 400 contains various reactive substances flowing towards one or more channel branches 406 from an inlet located on the end of the channel opposite one or more channel branches 406, the reactive substances may be exposed to catalytic material at channel location 402 rather than channel location 404. This may result in the catalytic material increasing the rate of reaction between the reactive substances at a later time relative to if the reactive substances were exposed to the catalytic material in channel location 404.

Figure 5A:
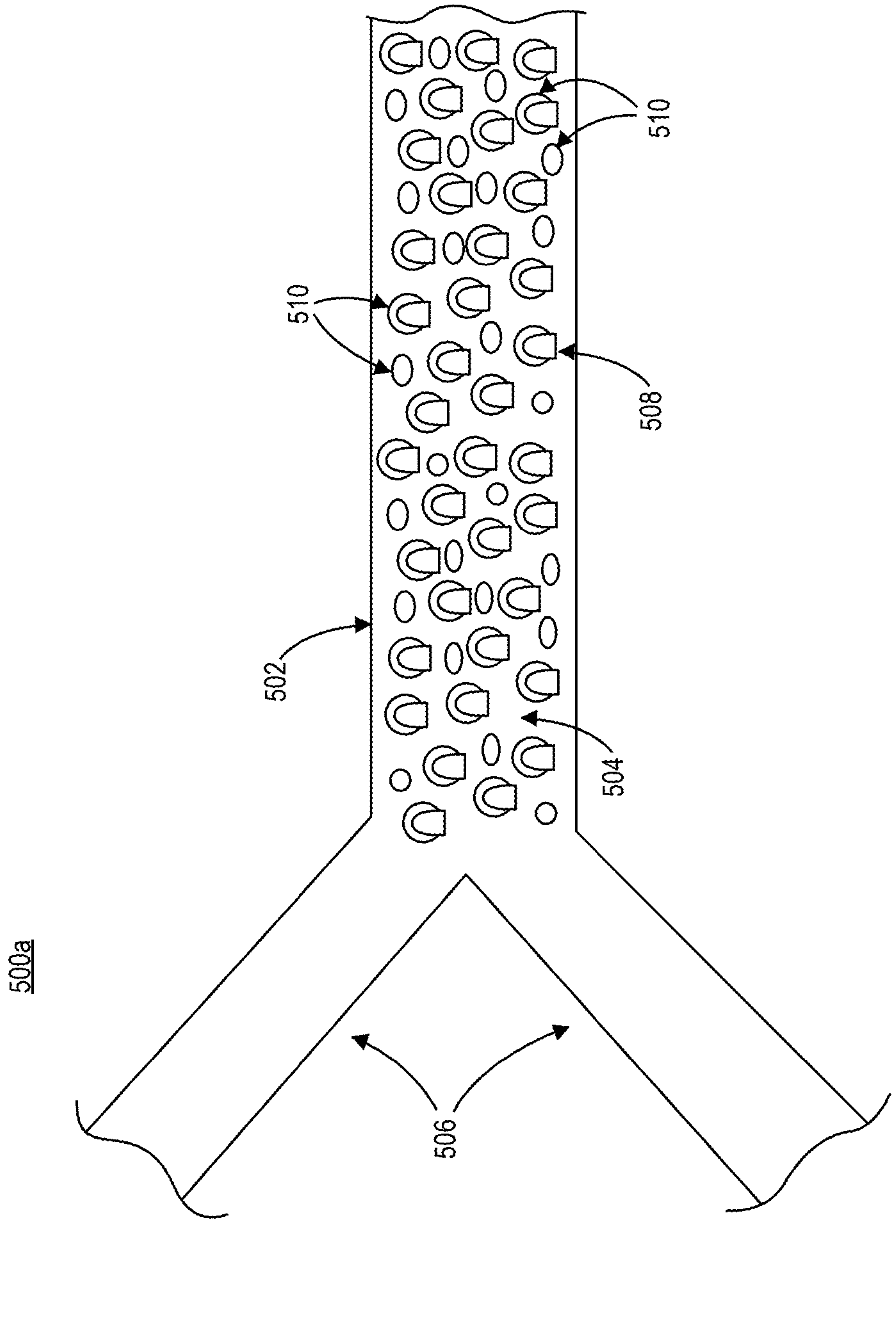
FIG. 5A depicts an exemplary channel system for catalysis in accordance with embodiments of the invention.

Continuing on, FIG. 5A depicts an exemplary channel system for catalysis in accordance with embodiments of the invention and generally referred to by reference numeral 500. In a substantially similar fashion to the channel systems depicted in FIGS. 1-4, channel system 500*a* may include channel 502, one or more pits 504, one or more channel branches 506, and plurality of microstructures 508. As such, the characteristics of channel 502, one or more pits 504, one or more channel branches 506, and plurality of microstructures 508 may be designed and tuned for a predetermined purpose, such as catalysis.

Generally, channel system 500*a* may include catalytic material in the form of catalyst 510. The catalytic material may be any suitable material now known or later developed, including, but not limited to, palladium (Pd), Pd on carbon, titanium, vanadium, iron, cobalt, nickel, copper, zinc, zirconium, ruthenium, rhodium, silver, platinum, gold, other transition metal catalysts, and similar catalysts. In some embodiments, channel system 500*a* may be used for flow chemistry such that introducing catalyst 510 may help facilitate a reaction occurring within channel system 500*a*.

In some embodiments, such as in a packed column reactor, catalyst 510 may be attached to a physical structure for support. The physical structure may be formed from an inert substance such that the substance does not react with reactive substances within the system and only behaves as a structural support for catalyst 510.

In some embodiments, catalyst 510 may be attached to a plurality of microstructures 508, such that plurality of microstructures 508 acts as structural support for catalyst 510. For example, catalyst 510 may attach to the surface of plurality of microstructures 508. In some embodiments, as described above, catalyst 510 may attach to various cracks and/or divots in plurality of microstructures 508 such that the cracks and/or divots structurally support catalyst 510. In some embodiments, catalyst 510 may be attached to one or more pits 504 between plurality of microstructures 508 such that one or more pits 504 behave as a catalyst support for catalyst 510. In such embodiments, the characteristics of one or more pits 504 may be tuned to support catalyst 510. For example, one or more pits 504 may be designed to have an increased depth relative to systems not designed for catalysis applications.

As depicted in FIG. 5A, catalyst 510 may be evenly distributed throughout channel 502 and/or one or more channel branches 506. As such, substances located within channel 502 may be exposed to catalyst anywhere in channel 502 and/or one or more channel branches 506. In a catalysis application, this means that one or more reactive substances flowing from the inlet to the outlet of channel system 500*a* may be exposed to the catalyst at all times in channel system 500*a*.

One benefit of attaching catalyst 510 to plurality of microstructures 508 and/or one or more pits 504 within channel 502 is a decrease in channeling. Namely, the structures supporting catalyst 510 may be dispersed in such a manner that substances flow evenly through and over plurality of microstructures 508 and one or more pits 504, causing catalyst 510 to be wetted evenly throughout the locations in which catalyst 510 is dispersed in the system. Additionally, plurality of microstructures 508 may be stably attached to channel 502 such that plurality of microstructures 508 do not move freely throughout the system and have the potential to congregate to a singular location in channel system 500*a*.

Figure 5B:
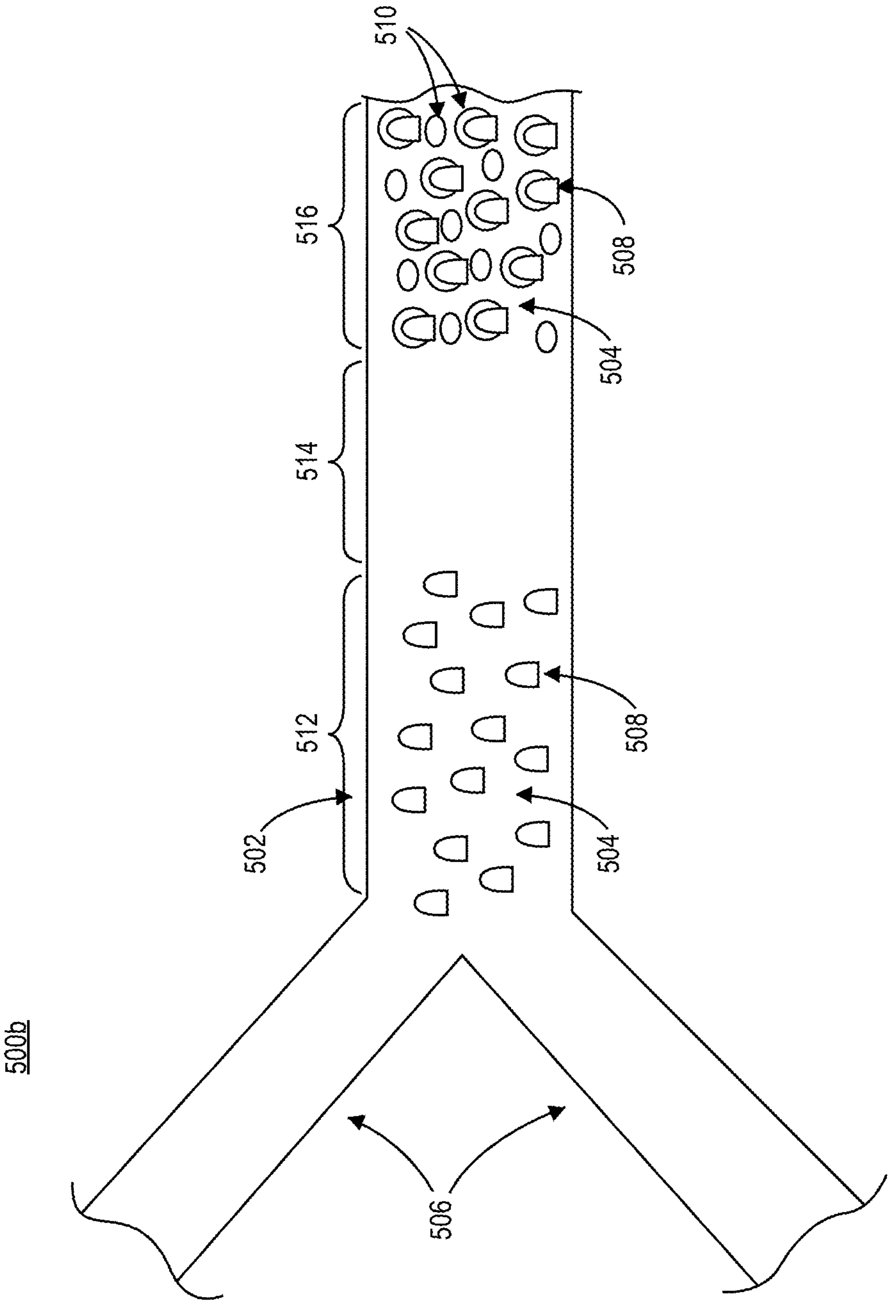
FIG. 5B depicts an exemplary channel system for catalysis in accordance with embodiments of the invention.

Continuing on, FIG. 5B depicts an exemplary channel system for catalysis in accordance with embodiments of the invention and generally referred to by reference numeral 500*b*. Similarly to channel system 500*a*, channel system 500*b* and the components of channel system 500*b* (such as one or more channel branches 506) may be substantially similar to the channel systems depicted in FIGS. 1-4. In some embodiments, in a substantially similar fashion to channel system 500*a*, channel system 500B may include channel 502, one or more pits 504, one or more channel branches 506, and plurality of microstructures 508.

As described in FIG. 5A, channel system 500*b* may include catalyst 510, which may serve to instigate a reaction upon being exposed to one or more substances within channel 502. In some embodiments, as depicted in FIG. 5A, catalyst 510 may be dispersed evenly or substantially evenly throughout channel 502 and/or one or more channel branches 506 of channel system 500*a*. In other embodiments, catalyst 510 may be dispersed randomly throughout the system, in particular locations of the system, and or unevenly throughout the system. Generally, the way in which catalyst 510 is dispersed may impact the use cases of channel system 500*b*. For example, if one or more reactive substances are only exposed to catalyst 510 when they enter channel 502 through an inlet, the beginning of the reaction between the one or more substances may be accelerated by catalyst 510, while the remainder of the reaction may occur at normal speeds. As such, all components of channel system 500*b* may be tuned to achieve purposes such as these.

In some embodiments, channel system 500*b* may include channel segment 512 containing a plurality of microstructures 508 and one or more pits 504; channel segment 514 containing neither plurality of microstructures 508, one or more pits 504, or catalyst 510; and channel segment 516 containing plurality of microstructures 508, one or more pits 504, and catalyst 510. By providing for different achievable configurations throughout channel system 500*b*, channel system 500*b* may be configured to serve particular purposes.

For example, channel system 500*b* may result in a specific outcome if exposed to one or more reactive substances during flow chemistry. Channel system 500*b* may only have microstructures with a catalyst attached at the inlet of the channel such that one or more substances flowing through channel system 500*b* are mixed and exposed to a catalyst at the beginning but not near the end of the channel. Accordingly, the one or more substances may mix and react with one another at an accelerated pace from the beginning of the reaction, which may affect the result of the chemical reaction.

Figure 6:
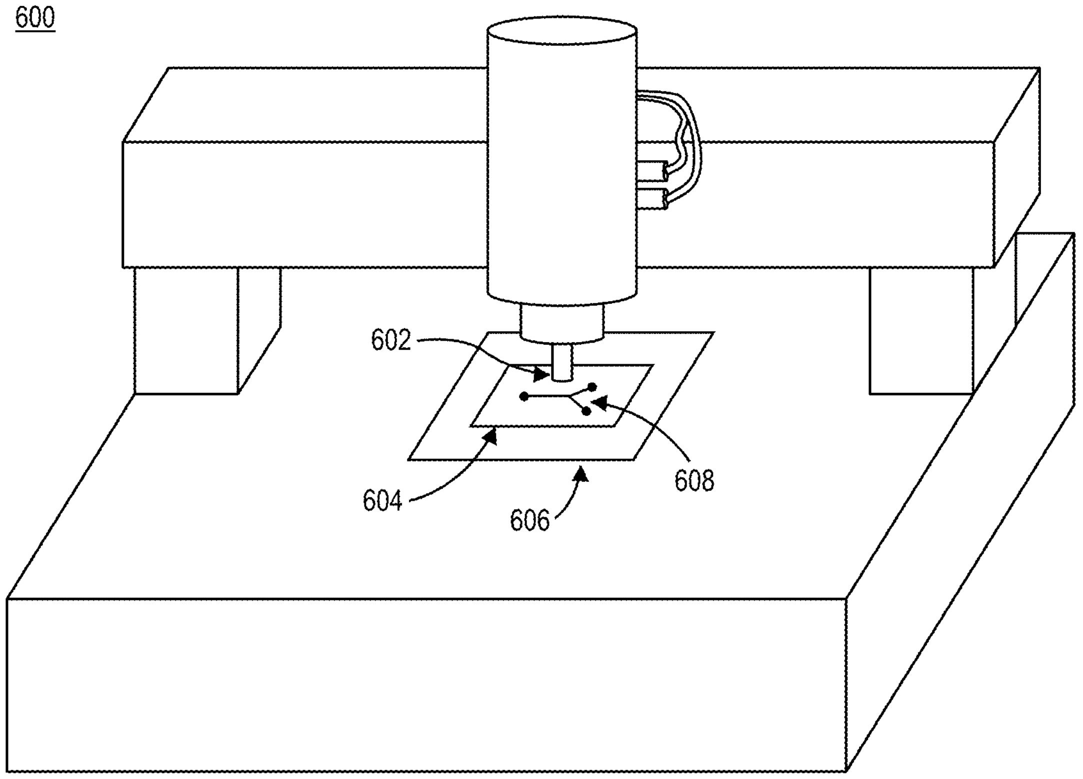
FIG. 6 depicts an exemplary channel fabrication system in accordance with embodiments of the invention.

FIG. 6 depicts an exemplary channel fabrication system in accordance with embodiments of the invention and is generally referred to by reference numeral 600. In some embodiments, channel fabrication system 600 may include a laser system 602 for engraving one or more areas on a surface. Generally, laser system 602 may be any laser system now known or later developed. For example, laser system 602 may be a femtosecond laser processing system including a femtosecond laser device.

In relation to FIGS. 1-5B, laser system 602 may be used to engrave channel 608, generally relating to channel 104 depicted in FIG. 1, on substrate 604, generally relating to substrate 102 depicted in FIG. 1. In order to engrave channel 608 on substrate 604 using laser system 602, substrate 604 may be placed on base plate 606. Base plate 606 may be any surface suitable for securing substrate 604 in such a manner that a predetermined pattern and/or channel 608 may be engraved on substrate 604.

In some embodiments, laser system 602 may then process substrate 604 such that channel 608 and/or an additional pattern is formed. As described above, the characteristics of channel 608 may be tunable such that channel 608 can form a variety of shapes and structures with respect to substrate 604. For example, as described above with regard to channel 204 and plurality of microstructures 208, channel 608 may be tunable such laser system 602 may modify the length, width, depth, height, density, and other characteristics of channel 608 and its various structures.

Figure 7:
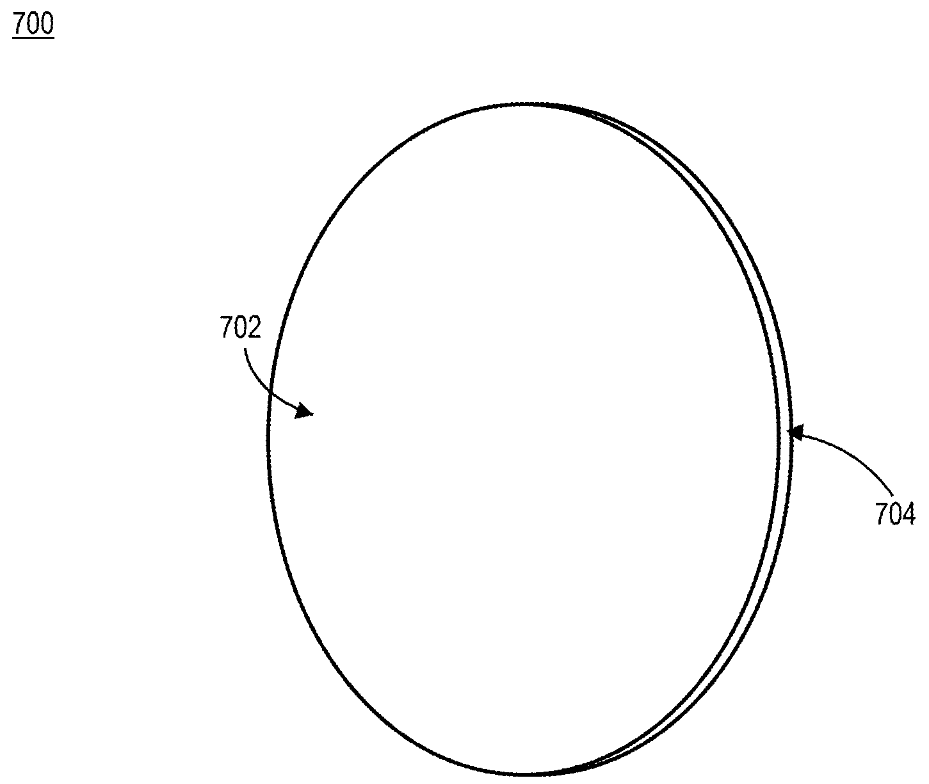
FIG. 7 depicts an exemplary modified surface for catalysis in accordance with embodiments of the invention.

Finally, it is noted herein that any surface may be fabricated such that the surface includes one or more microstructures, including one or more microstructures suitable for catalysis, and the catalysis application described with regard to FIGS. 5A-5B is not limited to channel systems, such as channel system 100. FIG. 7 depicts an exemplary modified surface in accordance with embodiments of the invention and is generally referred to by reference numeral 700. Generally, modified surface 700 may be any surface or structure suitable for fabrication (e.g. laser fabrication), including, but not limited to, wafers and support structures such as catalyst supports.

Modified surface 700 may be any shape, size, thickness, density, and material. In some embodiments, modified surface 700 may include face surface 702 (having a front surface and a back surface) and a rim surface 704 such that modified surface 700 is a wafer. Modified surface 700 may be any shape now known or later developed, including, but not limited to, a sphere, cube, hollow cube, solid cylinder, hollow cylinder, four-hole cylinder, single ring, cross web, grooved cylinder, pall ring, saddle, or any other shape suitable for laser processing.

In some embodiments, modified surface 700 may be processed such that modified surface 700 may include one or more microstructures and one or more pits, such as is described with regard to plurality of microstructures 208 and one or more pits 210 in FIG. 2. As described above with regard to FIGS. 5A-5B, the one or more microstructures on modified surface 700 may then be designed and tuned for a predetermined purpose, such as for attaching catalytic material. For example, modified surface 700 may be processed such that catalytic material may be attached to the microstructures and/or the pits of modified surface 700. The catalytic material may be any suitable material now known or later developed, including, but not limited to, Pd, Pd on carbon, titanium, vanadium, iron, cobalt, nickel, copper, zinc, zirconium, ruthenium, rhodium, silver, platinum, gold, other transition metal catalysts, and similar catalysts. In some embodiments, modified surface 700 may be used in a packed bed reactor and/or for flow chemistry such that introducing a catalyst may help facilitate a reaction occurring within a greater chemistry system. In some embodiments, such as in a packed column reactor, modified surface 700 may act as a catalyst support. Accordingly, modified surface 700 may be formed from an inert substance such that the substance does not react with reactive substances within the system and only behaves as a structural support for the catalyst.

As described above in FIGS. 5A-5B, catalytic material may be distributed in various ways across modified surface 700. For example, modified surface 700 may contain catalytic material on face surface 702 but not on rim surface 704. For another example, modified surface 700 may contain catalytic material on rim surface 704 but not on face surface 702. In some embodiments, only a portion of modified surface 700 may be fabricated to include one or more microstructures and one or more pits. For example, the front surface of face surface 702 may be fabricated, while the back surface of face surface 702 is non-fabricated. In such embodiments, the catalytic material may be unable to attach to non-fabricated portions of modified surface 700, thereby only distributing catalytic material on the fabricated portions of modified surface 700. In other embodiments, the entirety of the surface area of modified surface 700 may be subject to laser fabrication, such as by laser system 602 depicted in FIG. 6. For example, modified surface 700 may be a wafer in which the entirety of the surface area of the wafer has been modified with laser fabrication.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

The invention claimed is:

1. A channel system fabricated by a femtosecond laser device, the channel system comprising:

a substrate comprising a surface, wherein at least a portion of the surface is modified by the femtosecond laser device;

a channel engraved into the portion of the surface by the femtosecond laser device;

wherein the channel is configured to receive a substance;

a plurality of microstructures formed with the substrate by the femtosecond laser device and disposed within the channel; and one or more pits formed between adjacent microstructures of the plurality of microstructures; and a catalyst material attached to microstructure surfaces of a selected subset of the plurality of microstructures and to pit surfaces of a selected subset of the one or more pits, wherein the selected subset of the plurality of microstructures and the selected subset of the one or more pits are disposed in a first channel segment at or adjacent an inlet of the channel, and wherein a second channel segment downstream of the first channel segment includes microstructures of the plurality of microstructures that are free of the catalyst material.

2. The channel system of claim 1, wherein the channel comprises a channel branch attached to an end of the channel, wherein the channel branch is configured as an outlet of the channel, the outlet configured to expel the substance received into the channel.

3. The channel system of claim 2, wherein the end is a first end and the channel branch is a first channel branch, wherein the channel further comprises:

a second channel branch attached to a second end of the channel and configured as an inlet to the channel, the inlet configured to receive the substance within the channel.

4. The channel system of claim 3, further comprising:

the catalyst material attached to a microstructure surface of at least one microstructure of the plurality of microstructures at the inlet of the channel.

5. The channel system of claim 1, wherein the plurality of microstructures is dispersed evenly throughout the channel.

6. The channel system of claim 5, further comprising:

wherein each microstructure of the plurality of microstructures includes the catalyst material such that the catalyst material is dispersed evenly throughout the channel.

7. The channel system of claim 6, further comprising:

wherein the plurality of microstructures is at least one of mound-shaped, pyramid-shaped, or column-shaped.

8. A channel system fabricated by a femtosecond laser device, the channel system comprising:

a substrate comprising a surface, wherein at least a portion of the surface is modified by the femtosecond laser device;

a channel engraved into the portion of the surface by the femtosecond laser device;

wherein the channel comprises an inlet configured to receive a reactive substance;

a plurality of microstructures formed from the portion of the surface by the femtosecond laser device and disposed within the channel, wherein adjacent microstructures of the plurality of microstructures define one or more pits; and a deposited catalyst material attached to microstructure surfaces of a first subset of the plurality of microstructures and to a pit surface of at least one pit of the one or more pits, wherein the first subset of the plurality of microstructures and the at least one pit are disposed in a first channel segment at or adjacent the inlet, and wherein a second channel segment downstream of the first channel segment includes a second subset of the plurality of microstructures that is free of the deposited catalyst material.

9. The channel system of claim 8, wherein the channel comprises:

a first channel branch attached to an end of the channel, wherein the first channel branch is configured as a first outlet of the channel; and a second channel branch attached to the end of the channel, wherein the second channel branch is configured as a second outlet of the channel.

10. The channel system of claim 9, wherein the reactive substance is a first reactive substance, wherein the first outlet is configured to expel the first reactive substance disposed within the channel, wherein the second outlet is configured to expel a second reactive substance disposed within the channel and different from the first reactive substance.

11. The channel system of claim 8, wherein the reactive substance is reactive such that the catalyst material attached to at least one microstructure of the plurality of microstructures increases a rate of reaction of the reactive substance.

12. The channel system of claim 8, wherein the first channel segment comprises a first microstructure from the plurality of microstructures having a first shape, wherein the second channel segment comprises a second microstructure from the plurality of microstructures having a second shape.

13. The channel system of claim 8, wherein the one or more pits are disposed in the first channel segment.

14. The channel system of claim 8, wherein the deposited catalyst material is attached to pit surfaces of a plurality of pits of the one or more pits.

* * * * *